US012608080B1

(12) United States Patent
Boccato et al.

(10) Patent No.: US 12,608,080 B1
(45) Date of Patent: Apr. 21, 2026

(54) SIGHT DETECTION TO DYNAMICALLY SELECT VISIBLE PORTIONS OF FLEXIBLE DISPLAYS

(71) Applicant: Motorola Mobility LLC, Chicago, IL (US)

(72) Inventors: Bianca Boccato, Campinas (BR); Roberto Bresil, Campinas (BR); Marcos Sassahara, Campinas (BR); Jose Guilherme Simao Prado, Campinas (BR); Letricia Pereira Soares Avalhais, Jaguariuna (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/978,355

(22) Filed: Dec. 12, 2024

(51) Int. Cl.
*G06F 3/01* (2006.01)
*H04M 1/02* (2006.01)

(52) U.S. Cl.
CPC .......... *G06F 3/013* (2013.01); *H04M 1/0264* (2013.01); *H04M 1/0268* (2013.01)

(58) Field of Classification Search
None
See application file for complete search history.

(56) References Cited

U.S. PATENT DOCUMENTS

2015/0348453 A1* 12/2015 Jin .......................... G09F 9/301
345/173

OTHER PUBLICATIONS

Raphael, Jr, "How to control your Android phone with your face", IDG Communications, Inc., Computerworld [online] [retrieved Jan. 6, 2025]. Retrieved from the Internet <https://www.computerworld.com/article/1614892/android-phone-face-control.html>., Mar. 6, 2024, 11 Pages.

Samsung, "What is the Smart Scroll™ feature on my Samsung Galaxy Alpha®?", Samsung [online] [retrieved Jan. 6, 2025]. Retrieved from the Internet <https://www.samsung.com/za/support/mobile-devices/what-is-the-smart-scroll-feature-on-my-samsung-galaxy-alpha/?, cid=ca_paid_affiliate_awin_none_ecommerce_IDG+Communications%2C+Inc_banner_none_none&sv1=affiliate&sv_campaign_id=531979&awc=18530_1702647528_7339564dce98bd3a0751.

Velazco, Chris, "A closer look at Lenovo's bendable concept phone and tablet", Engadget [online] [retrieved Jan. 6, 2025]. Retrieved from the Internet <https://www.engadget.com/2016-06-09-a-closer-look-at-lenovos-bendy-concept-phone-and-tablet.html>., Jun. 9, 2016, 60 Pages.

* cited by examiner

*Primary Examiner* — Parul H Gupta
(74) *Attorney, Agent, or Firm* — FIG. 1 Patents

(57) ABSTRACT

Techniques for sight detection to dynamically select visible portions of flexible displays are described and are implementable to improve user engagement with graphical content that is output from the flexible display. In implementations, a mobile device includes a flexible display, a sensor, and at least one processor. The processor is configured to cause the mobile device to detect a user line of sight to the flexible display based on the sensor. A visible display region of the flexible display is selected based on a fold position where the flexible display is bent, a sensor position, and the user line of sight. Then, the flexible display is controlled to present graphical content in the visible display region.

20 Claims, 7 Drawing Sheets

500

502
Execute an application that generates graphical content to be presented on a flexible display 504
Identify a fold position where the flexible display is bent 506
Detect a user line of sight to the flexible display based on a sensor 508
User line of sight detectable with the sensor?

YES

NO

510
Select a near-sensor display region between a sensor position and the fold position 512
Select a far-sensor display region between the fold position and a farthest end of the flexible display as the sensor position 514
Display the graphical content in the selected display region 500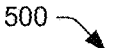

502
Execute an application that generates graphical content to be presented on a flexible display

504
Identify a fold position where the flexible display is bent

506
Detect a user line of sight to the flexible display based on a sensor

508
User line of sight detectable with the sensor?

YES

NO

510
Select a near-sensor display region between a sensor position and the fold position

512
Select a far-sensor display region between the fold position and a farthest end of the flexible display as the sensor position

514
Display the graphical content in the selected display region

*Fig. 5*

SIGHT DETECTION TO DYNAMICALLY SELECT VISIBLE PORTIONS OF FLEXIBLE DISPLAYS

BACKGROUND

Display technology has evolved to produce flexible display screens, which allow for bendable devices. A user may fold a bendable phone or tablet to help keep the device partially upright when placed on a surface to be used out of hand (e.g., when viewing from a distance or when being viewed by multiple people). In other scenarios, the user shapes the flexible display into a wearable device that fits snugly around that person's arm or wrist, similar to a computerized watch or bracelet device.

BRIEF DESCRIPTION OF THE DRAWINGS

Aspects of sight detection to dynamically select visible portions of flexible displays are described with reference to the following Figures. The same numbers may be used throughout to reference similar features and components that are shown in the Figures. Further, identical numbers followed by different letters reference different instances of features and components described herein.

FIG. 5 illustrates a flow chart depicting an example method for sight detection to dynamically select visible portions of flexible displays in accordance with one or more implementations.

DETAILED DESCRIPTION

Figure 1:
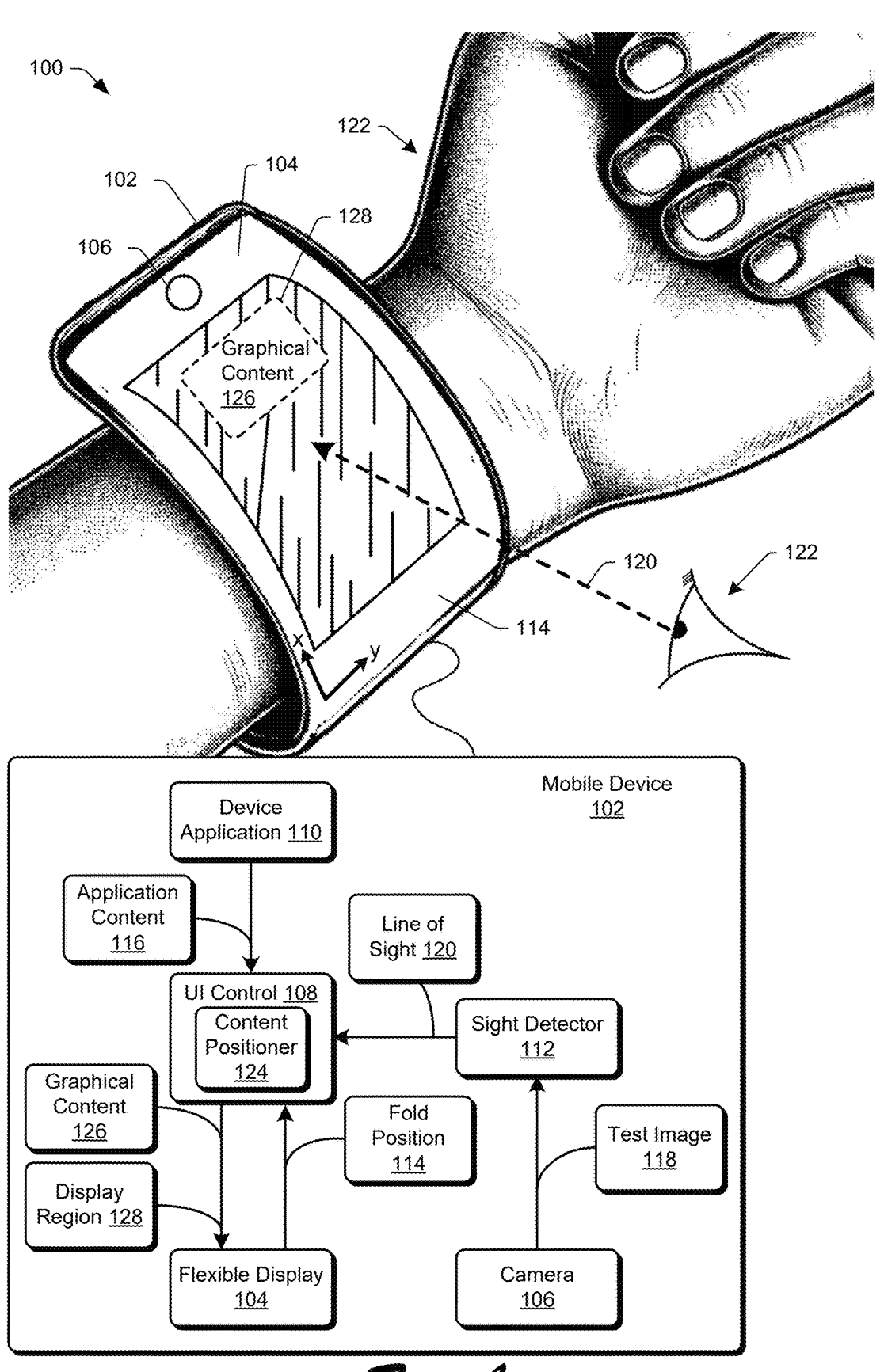
FIG. 1 illustrates an example environment in which aspects of sight detection to dynamically select visible portions of flexible displays can be implemented in accordance with one or more implementations.

Techniques to dynamically select visible portions of flexible displays are described and implementable to improve user engagement with graphical content that is output on a bent or folded screen. As mentioned above, flexible displays (e.g., display devices, display screens) allow bendable device designs, which have the potential to improve device functionality and user satisfaction.

In at least one implementation, a mobile device, such as a mobile phone, includes a flexible display and a sensor, such as a camera, positioned relative the flexible display (e.g., at one end of the flexible display, at a location behind the flexible display). The flexible display includes one or more fold positions where a display surface of the mobile device can be manipulated into a folded or bent shape. For example, the flexible display includes at least one fold position near a middle display region to configure the mobile device to operate in a so-called tent mode, taking on a U-shape or a V-shape. In at least one example, the flexible display includes multiple fold positions, such as a near-camera fold position located near a same end of the display screen as the camera, and a far-camera fold position located near a farthest end of the display screen (e.g., an opposite end of the display screen) from the camera. Bending the mobile device at either the near-camera fold position or the far-camera fold position configures the mobile device to operate in a so-called ramp mode, taking on an L-shape or a J-shape.

Having folded the mobile device, the display surface of the flexible display is no longer flat. The bendable formfactor enables the mobile device to support several use cases unsupported by conventional, non-bendable mobile devices. For example, a user frees up a hand by wearing the U-shaped mobile device on an arm or wrist. As another example, the user sets the reshaped mobile device onto a flat surface, e.g., to view the flexible display at a distance, or to share the experience with others standing or sitting nearby.

Various challenges can arise when a mobile device has a bendable, foldable, or flexible form factor. Graphical information output to a conventional display on a rigid and flat screen is typically viewable no matter where on the screen the graphical information is shown. However, when a flexible display is folded, and a display screen is no longer flat, graphical information may be output to a display region located beyond a fold position. The graphical information may appear in a display region that is outside a user line of sight, which reduces user satisfaction. To avoid situations such as this, the example mobile device is configured to control information presented on a same display surface (e.g., on a front surface or on a back surface of the mobile device) to output graphical information to flexible display regions on a display surface that are visible to the user, and refrain from displaying graphical content in other display regions of that same display surface that are not visible or not actively being viewed.

In this example, the mobile device includes at least one processor configured to execute one or more device applications. A device application, for instance, outputs graphical content to be presented in a user interface of the mobile device. The output of the graphical content causes a content positioner of the user interface to determine a visible display region of the flexible display to present the graphical content. For example, the content positioner determines the visible display region based on a fold position (e.g., a single fold position of the flexible display, one of a plurality of different fold positions received from the flexible display or display controller thereof), a camera position relative to the fold position and the flexible display, and a user line of sight detected based on the camera.

The camera, which may be referred to as a screen facing camera (e.g., a so called "front facing camera"), has a field of view that projects outward from a display surface (e.g., screen) provided by the flexible display. The camera is configured to capture an image of an environment, and based on the image, a sight detector detects a user's line of sight to the flexible display. For example, the content positioner communicates with the sight detector to receive the line of sight extracted from a test image captured by the camera. In at least one implementation, the camera is replaced or used in conjunction with at least one other sensor that is operable to generate sensor data for the sight detector. A radar sensor, a lidar sensor, and an infrared sensor are other types of sensors that may generate sensor data used by the sight detector to discern the user line of sight relative the flexible display.

Based on the fold position received from the flexible display and the user line of sight obtained from the sight detector, the content positioner determines a display region of the flexible display for presenting the graphical content. For example, the content positioner obtains a camera position (or a sensor position of another sensor used to determine the user line of sight) relative the flexible display. The camera may be located adjacent an edge of the flexible display, behind the flexible display, in front of the flexible display, surrounded by portions of the flexible display, or in some other position relative the flexible display. In some cases, the camera has a camera position that is closer to one end of the flexible display (e.g., a near end) than another, farthest end of the flexible display. The content positioner may select the visible display region to be a near-sensor display region between the sensor position and the fold position when the user line of sight is detectable with the sensor. For example, if a test image from a camera depicts at least a portion of a human face, then the content positioner sends the graphical content to the flexible display for output in a near-sensor or near-camera display region between the camera position and the fold position. If, however, the test image from the camera does not show at least a portion of a human face, then the content positioner sends the graphical content to the flexible display for output in a far-sensor or far-camera display region located on a same display surface as the near-sensor display region, however, between the fold position and an opposite end of the flexible display as the camera position. The graphical information may be presented between the fold position and the near-camera display region when the user line of sight is detected with the camera, and the graphical information is presented between the fold position and the far-camera display region when the user line of sight is not detectable (at least not discernible with the camera).

By analyzing a user line of sight relative a fold position in a flexible display, the content positioner configures the mobile device to overcome various challenges with displaying graphical content on a display surface of a mobile device that has a bendable form factor. The described techniques enable bendable mobile device to efficiently identify, and output graphical content in, a flexible display region despite the fold, which improves user satisfaction.

While features and concepts of sight detection to dynamically select visible portions of flexible displays can be implemented in any number of environments and/or configurations, aspects of the techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of sight detection to dynamically select visible portions of flexible displays can be implemented in accordance with one or more implementations. The environment 100 includes a mobile device 102 with a flexible display 104 and a camera 106. The mobile device 102 represents any camera enabled device, such as a mobile phone, a tablet device, a laptop computer, a wearable device, and so forth, operable to capture images of the environment 100 for detecting user line of sight to the mobile device 102. The mobile device 102, with the flexible display and the camera 106, can represent any type of an electronic and/or computing device implemented with various components, such as a processing system having one or more processors, memory, as well as any number and combination of different components as further described with reference to the example device 600 shown in FIG. 6.

The flexible display 104 may be referred to as a foldable display, a rollable display, or a bendable display. The flexible display 104 includes electronic display technology for presenting graphical information that is bendable without breaking. Light-Emitting Diode (LED) and Liquid Crystal Display (LCD) technology may be used by the flexible display, including Organic Light-Emitting Diode (OLED) and Organic Liquid Crystal Display (OLCD) technology. The flexible display 104 may include a plastic or metal substrate, a thin-film transistor (TFT) layer for controlling power to pixels, and a protective cover layer made from polyimide or ultra-thin glass.

In at least one example, similar to conventional mobile phone and tablet designs, a housing of the mobile device 102 is configured to support rectangular front and back surfaces. The flexible display 104 may have a corresponding rectangular shape. As such, two ends of the display surface of the flexible display 104 may be shorter than two other ends of the flexible display 104. A display surface of the flexible display 104 (e.g., protected by the cover layer) can structurally form the front and/or back surface of the mobile device 102.

The flexible display 104 is configured to fold or bend at one or more fold positions on the display surface. For example, the display surface may be divided into a grid of pixels arranged in multiple columns and rows. Each column of pixels may span between the opposing short edges of the flexible display 104, and each row may span between the longer opposing edges. Each fold position of the flexible display 104 may correspond to one or more rows or columns of the pixels. As one example, the flexible display 104 includes a fold position in a middle row. In another example, the flexible display 104 includes a fold position in a middle row and two other rows located on opposite sides of the flexible display 104. In yet another example, the flexible display 104 includes more than three fold positions, such as having a fold position at each pixel row, at every other pixel row, etc. to allow the flexible display 104 to be manipulated into a wide variety of folded shapes.

The camera 106 may be a screen facing camera (e.g., a front facing camera), or in other implementations, the camera 106 is rear facing camera of the mobile device 102. Multiple cameras, lenses, and camera components may be integrated as a single camera system represented by the camera 106. In at least one example, the camera 106 is a front-facing camera and has a camera lens with a field of view that projects outward from a display surface of the flexible display 104. For example, the camera 106 is configured to capture images of one or more people looking at the graphical content being presented on the display surface of the flexible display 104. The camera 106 is characterized by a camera position relative the flexible display 104. In at least one implementation, the camera 106 is positioned closer to one side of the flexible display 104 than another side of the flexible display 104 (e.g., a furthest side of the flexible display relative the camera 106), such as near one of the shorter sides of the display surface, including on one side of a middle fold position. When the flexible display 104 is rectangular, the camera position of the camera 106 may be closer to one of two shorter ends of the flexible display 104.

In at least one implementation, at least one processor of the mobile device 102 executes instructions to implement a user interface control, which is labeled as UI control 108. The UI control 108 may be part of an operating system of the mobile device 102, and in other examples, the UI control 108 is part of the device application 110 or other application, thread, or service executing on the mobile device 102. Operations performed by the UI control 108 enable the mobile device 102 to manage and control a user interface, including to coordinate the presentation of visual content at the flexible display 104. For example, the at least one processor of the mobile device 102 is depicted in FIG. 1 as further executing a device application 110 and a sight detector 112. The device application 110 represents various programs, threads, or services. During execution on the mobile device 102, the device application 110 outputs information (e.g., application content) to the UI control 108 for presentation in the user interface. The sight detector 112 is a program, thread, or service executing on the mobile device 102. The sight detector 112 receives camera data from the camera 106 or sensor data from other non-camera sensors, to estimate a user gaze relative the mobile device 102.

When the UI control 108 receives application content 116 output from the device application 110, the UI control 108 may communicate with the flexible display 104 to obtain a fold position 114 or may be preprogrammed with information about the fold position 114 (e.g., when the flexible display 104 has a single fold position). The sight detector 112 receives a test image 118 generated by the camera 106 and analyzes the image to identify a human face, human eyes, human pupils, etc. The sight detector 112 infers a line of sight 120 between a user 122 of the mobile device 102 and the camera 106, and outputs the line of sight 120 to the UI control 108. Then, based on the fold position 114, the line of sight 120, and a camera position of the camera 106, the UI control 108 uses a content positioner 124 to determine where to position graphical content 126 obtained from the application content 116 to be visible to the user 122 when displayed by the flexible display 104. The content positioner 124 selects a visible display region 128 of the flexible display 104 based on the fold position 114, the camera (or other sensor) position, and the user line of sight 120. The graphical content 126 and the display region 128 are output from the UI control 108 to cause the flexible display 104 to display the graphical content 126 at one or more pixel coordinates of the flexible display 104 that correspond to the display region 128.

The UI control 108, the device application 110, the sight detector 112, the content positioner 124, and components of each thereof, may be implemented as a module that includes independent processing, memory, and/or logic components functioning as a computing and/or electronic device integrated with the mobile device. In at least one implementation, the UI control 108, the device application 110, the sight detector 112, and/or the content positioner 124 includes one or more modules, which are executed in an application execution environment of the mobile device 102 (e.g., an operating system executed by a central processing unit or CPU of the mobile device 102). Each of the UI control 108, the device application 110, the sight detector 112, and/or the content positioner 124 may represent one or more programs, threads, services, or executables. Alternatively or in addition, the UI control 108, the device application 110, the sight detector 112, and/or the content positioner 124, and components thereof, can be implemented as a software application or software module, such as integrated with the operating system running on the CPU, for instance, based on computer-executable instructions loaded in memory or storage of the mobile device 102. As software applications or modules, the UI control 108, the device application 110, the sight detector 112, and/or the content positioner 124, and supporting components of each may also be implemented as one or more artificial intelligence algorithms and/or machine learning algorithms. Alternatively or in addition, the UI control 108, the device application 110, the sight detector 112, and/or the content positioner 124, and related parts of each may be implemented in firmware and/or at least partially in computer hardware. For example, at least part of the UI control 108, the device application 110, the sight detector 112, and/or the content positioner 124 is executable as firmware, and another part is implemented by a software executable, and another part is implemented in logic or circuitry of the mobile device 102.

In some examples, the content positioner 124 selects the display region 128 based on a size (e.g., pixel width, pixel height) of the graphical content 126. For example, the content positioner 124 determines whether pixel dimensions of the graphical content 126 exceed pixel dimensions of different display regions and selects the display region 128 based on having pixel dimensions that satisfy the size of the graphical content 126.

In one or more examples, the content positioner 124 determines whether the graphical content 126 obtained from the application content 116 is resizable to fit within the display region 128. For example, the size of the graphical content 126 is too large for the display region 128 and each other display region being considered by the content positioner 124. The content positioner 124 may scale or crop the graphical content 126 to have a smaller size that fits a size of the display region 128. As another example, the size of the graphical content 126 is too small for the display region 128. The content positioner 124 may scale or expand the graphical content 126 to have a larger size that fits the size of the display region 128. The graphical content 126 may be displayed in the display region 128 in response to the content positioner 124 resizing the graphical content 126 to fit within the display region 128.

In at least one example, the content positioner 124 orients the graphical content 126 to be displayed in the display region 128 to correspond to an orientation of a human face depicted in the test image 118. For example, if the camera 106 is orientated upside down after the mobile device is folded, the test image 118 may capture an upside down face or upside down eyes of the user 122. The content positioner 124 reorients the graphical content 126 to appear upside down, such that when the graphical content 126 is output for display in the display region 128, the graphical content 126 appears from the line of sight 120 to be right-side up.

The techniques described enable the mobile device 102 to enhance a visual experience of the user 122 as the user 122 interacts with the flexible display 104. For example, the user 122 is illustrated in FIG. 1 as wearing the mobile device 102 similar to an electronic watch or electronic bracelet. The fold position 114 (e.g., a single fold position associated with the flexible display 104, one of a plurality of different fold positions reported from the flexible display 104), as depicted in FIG. 1, corresponds to an area of the flexible display 104 that is at least partially bent about a user arm or user wrist of the user 122. As the user 122 moves and twists the wrist, previously visible regions of the flexible display 104 move out of the line of sight 120, and previously obscured regions of the flexible display move into the line of sight 120. The content positioner 124 dynamically updates the display region 128 to compensate for the change in visible display regions, which allows the flexible display 104 to keep the graphical content 126 visible.

Figure 2:
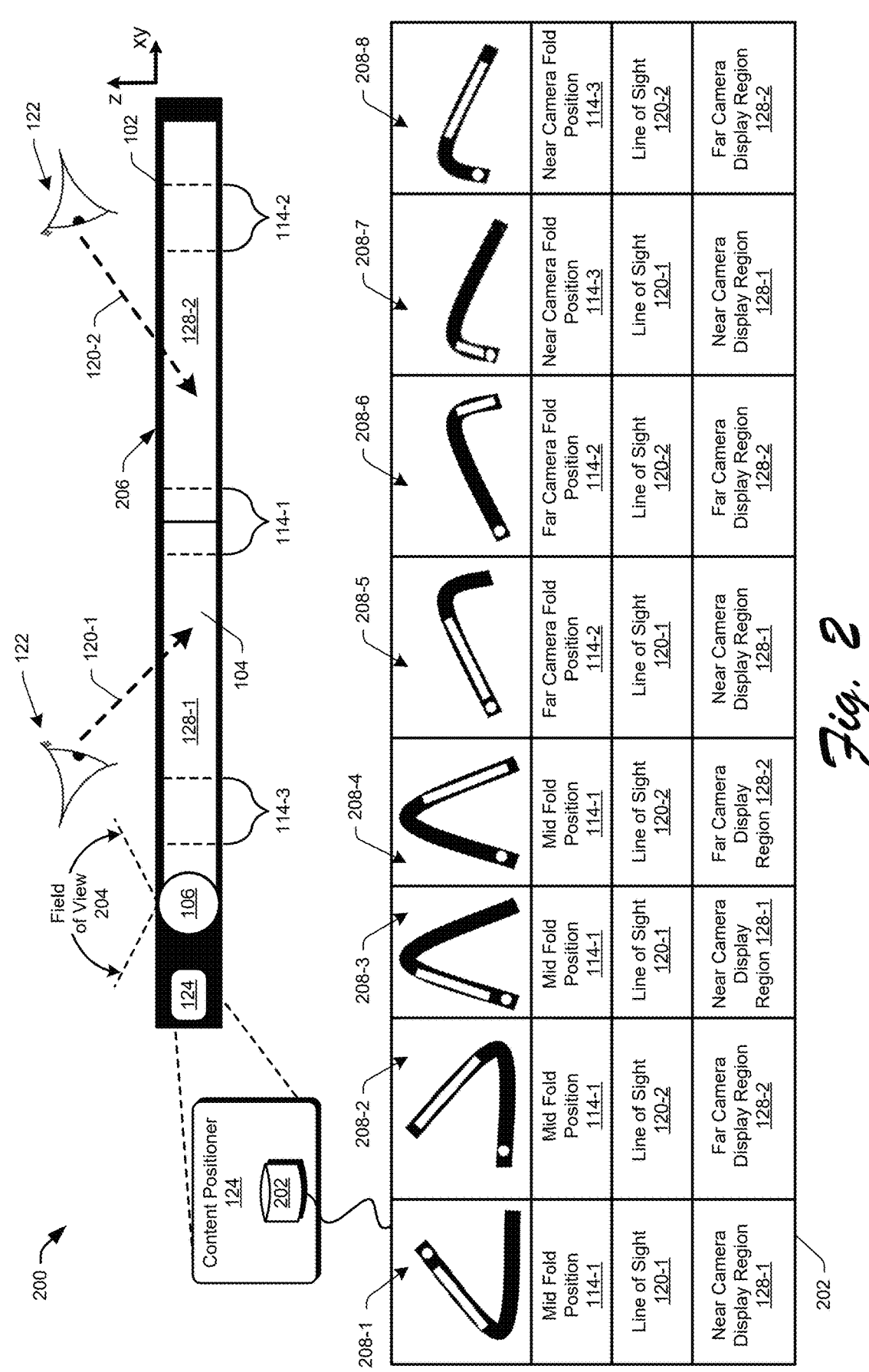
FIG. 2 depicts a conceptual diagram of example content positioner logic that can be implemented to dynamically select visible portions of flexible displays in accordance with one or more implementations.

FIG. 2 depicts a conceptual diagram 200 of example content positioner logic 202 that can be implemented to dynamically select visible portions of flexible displays in accordance with one or more implementations. The diagram 200 and the content positioner logic 202 is described in the context of the environment 100 and being implemented on the mobile device 102 using similarly labeled elements as FIG. 1. For example, the content positioner 124 may apply the content positioner logic 202 to determine the display region 128 as mentioned above.

As illustrated in FIG. 2, the camera 106 of the mobile device 102 has a camera lens with a field of view 204 that projects outward (e.g., in a Z-direction) from a display surface 206 of the flexible display 104 (e.g., on an XY-plane) that presents the graphical content 126. For example, the camera 106 (or other sensor) is configured to detect presence of the user 122, including presence of a human face or eyes of the user 122 in the field of view 204. The camera 106 captures the test image 118, for instance, and the sight detector 112 outputs the line of sight 120 estimated from the test image 118 based on whether the user 122 is detected in the field of view 204.

In some examples, when the sight detector 112 detects the user 122 from the test image 118, the content positioner 124 receives an indication that the user 122 has a first line of sight 120-1 relative to the display surface 206. For example, the first line of sight 120-1 is output from the sight detector 112 to indicate the user 122 is camera detectable when the image 118 depicts at least a portion of a human face. In some examples, when the sight detector 112 fails to detect the user 122 or presence of a human face from the test image 118, the content positioner 124 receives an indication that the user 122 has a second line of sight 120-2 relative to the display surface 206. For example, the second line of sight 120-2 is output from the sight detector 112 to indicate the user 122 is not camera detectable when the image 118 does not depict presence of the user 122 or a human face.

In this illustrated example, the flexible display 104 has a plurality of different fold positions. A middle fold position 114-1 divides a first display region 128-1 of the display surface 206 from a second display region 128-2 of the display surface 206. For example, when the flexible display 104 is rectangular, the middle fold position 114-1 is located between the two shorter ends of the rectangular shape. A far-sensor fold position 114-2 is labeled at farthest end of the flexible display 104 as the camera position of the camera 106. The far camera fold position 114-2, for instance, is closer to a farthest end of the flexible display 104 from the camera position of the camera 106. A near-sensor fold position 114-3 is labeled adjacent to the camera position of the camera 106, on a closest side of the flexible display 104 to the far-sensor fold position 114-2. The near camera fold position 114-3, for instance, is closer to the camera position of the camera 106 than the farthest short end of the flexible display 104 that is near the far-sensor fold position 114-2. In some examples, the flexible display 104 has more than three fold positions, and in other examples, the flexible display 104 has fewer than three fold positions, including a single fold position on various implementations. The content positioner 124 is aware of the fold position 114 (e.g., when the flexible display 104 has a single fold position) or receives the fold position 114 from the flexible display 104 (e.g., when the flexible display 104 has a plurality of different fold positions) to determine where the flexible display is folded.

The content positioner logic 202 is illustrated as a table of display region selections. Each column in the table of display region selections 208 is labeled as a one of display region selection 208-1 through display region selection 208-8. In other examples, the content positioner logic 202 uses additional or fewer than the display region selections 208 illustrated in FIG. 2. The display region selection 208-1 through display region selection 208-8 correspond to display regions of a same display screen (e.g., the display surface 206). In some examples, another display surface (e.g., different than the display surface 206) is integrated on the mobile device 102 on a back surface or opposite surface as the display surface 206. The sight detector 112 is configured to select one display region or another display region from within the same display surface 206 of the flexible display 104. The content positioner logic 202 enables the content positioner 124 to select from the display region 128-1 and the display region 128-2 as the display region 128 to use for outputting the graphical content 126 based on the fold position, a camera position, and the user line of sight.

The content positioner logic 202 enables the content positioner 124 to select the display region 128 to be the near sensor display region 128-1 between the camera 106 (e.g., or other sensor position) and the fold position 114-1 when the user 122 has the line of sight 120-1, which is detectable with the camera 106. In other situations, the content positioner logic 202 enables the content positioner 124 to select the display region 128 to be the far-sensor display region 128-2 between the camera 106 (e.g., or other sensor position) and the fold position 114-1 when the user 122 does not have the line of sight 120-1 and instead has the line of sight 120-2, which undetectable with the camera 106.

The content positioner 124 may perform a lookup of the display region selections 208 maintained by the content positioner logic 202 using lookup parameters that indicate a current fold position, camera position, and line of sight. For example, the content positioner logic 202 chooses one of the display region selections 208 that corresponds to the lookup parameters defined by the content positioner 124. Examples of retrieving one of the display region selections 208 from the content positioner logic 202 is described with reference to the drawings depicted in FIGS. 3a, 3b, 3c, 3d, 4a, and 4b. FIG. 3a, FIG. 3b, FIG. 3c, FIG. 3d, FIG. 4a, and FIG. 4b each depict an example of the mobile device 102 performing aspects of sight detection to dynamically select visible portions of flexible displays in accordance with one or more implementations.

Figure 3A:
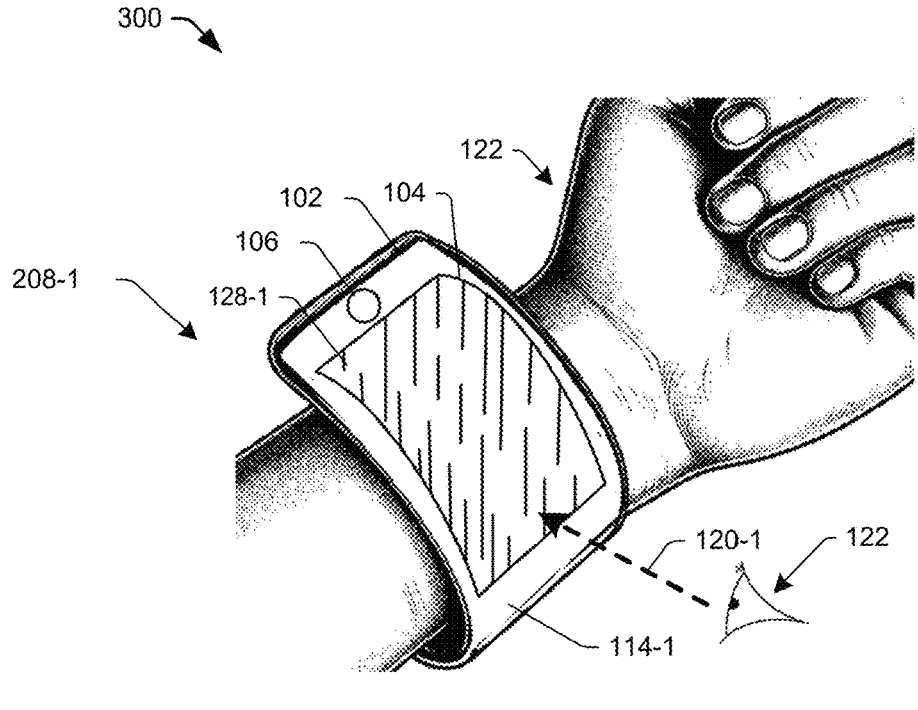
FIG. 3a, FIG. 3b, FIG. 3c, and FIG. 3d each depict an example of a mobile device performing aspects of sight detection to dynamically select visible portions of flexible displays in accordance with one or more implementations.

Consider the display region selection 208-1, which depicts a scenario 300 illustrated in FIG. 3a. In the scenario 300, the user 122 wraps the mobile device 102 around a user wrist to form the mobile device 102 into a U-shape. The flexible display 104 is folded at the middle fold position 114-1. The fold position 114-1 corresponds to an area of the flexible display 104 that is at least partially bent about a user arm or user wrist. The camera 106 captures the test image 118 from a camera position that is visible to the user 122, which in this example has the line of sight 120-1. The content positioner logic 202 causes the content positioner 124 to select the near sensor display region 128-1 of the display surface 206 between the camera 106 and the middle fold position 114-1 when the line of sight 120-1 is detectable with the camera 106.

Figure 3B:
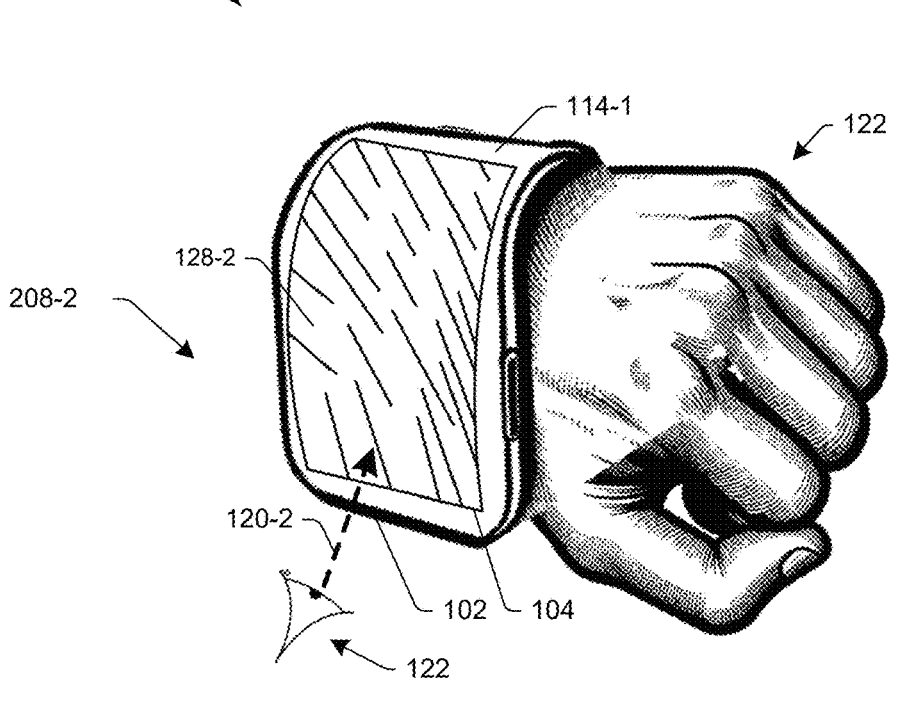

Next, consider a display region selection 208-2, which depicts a scenario 302 illustrated in FIG. 3b. In the scenario 302, the user 122 is wearing the mobile device 102 by bending the flexible display 104 at the middle fold position 114-1 and wrapping the flexible display 104 around a user wrist to form a U-shape. The camera 106 captures the test image 118 from a camera position, which in the scenario 302 is obscured or not visible to the user 122. For example, a human face or human eyes are not detectable from the field of view 204 when the user has the line of sight 120-2. The content positioner logic 202 causes the content positioner 124 to select the far-sensor display region 128-2 between the middle fold position 114-1 and a farthest end of the flexible display 104 (e.g., an opposite end of the flexible display 104) from the camera 106 when the user 122 has the line of sight 120-2, which is not detectable with the camera 106.

Figure 3C:
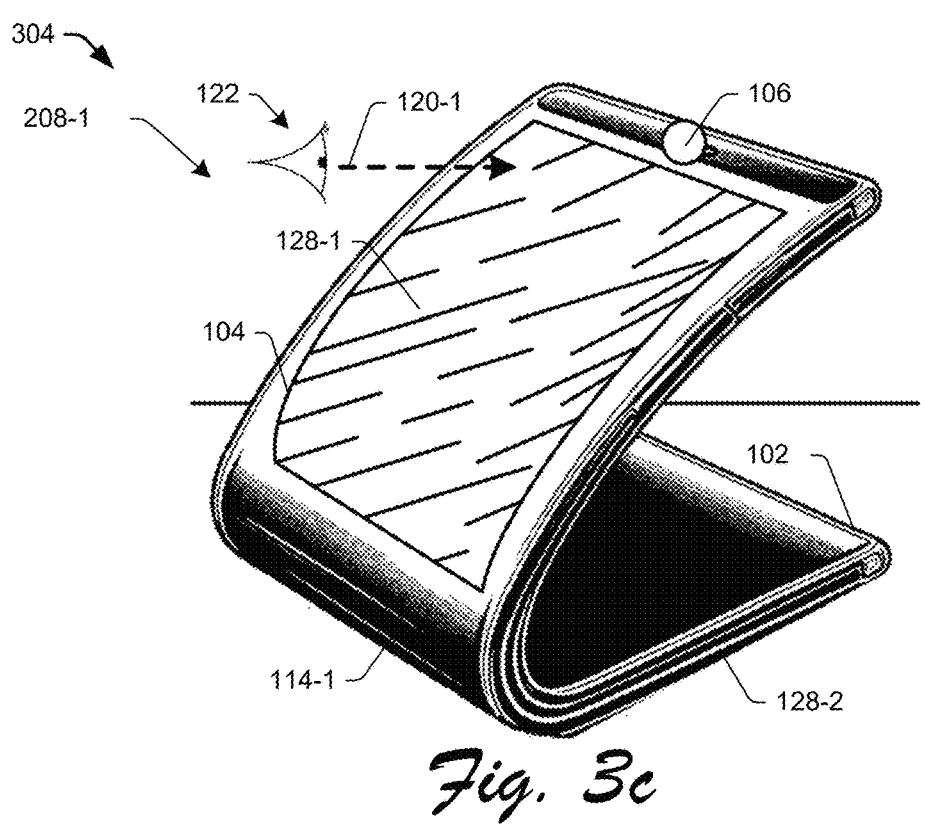

FIG. 3c illustrates scenario 304, which is a variation on the scenario 300 involving the display region selection 208-1. In the scenario 304, the user 122 sets the mobile device 102 on a surface (e.g., a table) after forming the flexible display 104 into a U-shape or V-shape. The mobile device 102 is placed on a surface that contacts the display region 128-2 of the flexible display 104, which is opposite the display region 128-1 that is visible in this position. The flexible display 104 is folded at the middle fold position 114-1, and the far-sensor display region 128-2 is embedded in one of the legs of the U-shape or V-shape, which is face down on the surface. The camera 106 captures the test image 118 from a camera position that is visible to the user 122 to determine the line of sight 120-1. The content positioner logic 202 causes the content positioner 124 to select the near sensor display region 128-1 between the camera position and the middle fold position 114-1.

Figure 3D:
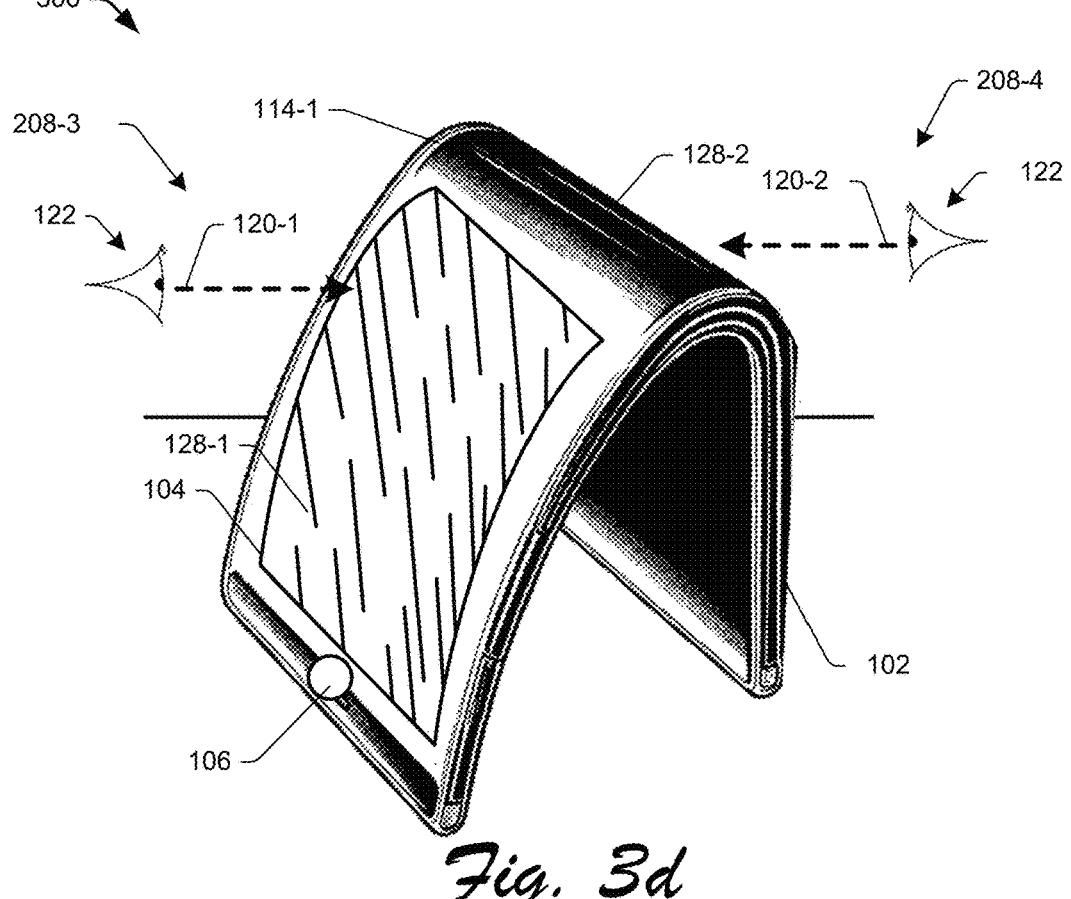

Next, consider a display region selection 208-3 and a display region selection 208-4, which are each depicted in a scenario 306 illustrated in FIG. 3d. In the scenario 306, the user 122 sets the mobile device 102 on a surface after forming the flexible display 104 into a U-shape or V-shape. For example, the mobile device 102 is placed on a surface that contacts each of the two shorter ends of the flexible display 104, e.g., one end of the flexible display 104 near the camera 106 and an opposite end of the flexible display 104 from the camera 106. In this configuration, the mobile device 102 is operating in tent mode, which is useful for group viewing or viewing the mobile device 102 from a distance.

When the user 122 is viewing the mobile device 102 from a camera side of the flexible display 104, the content positioner logic 202 causes the content positioner 124 to select the near-sensor display region 128-1 in response to the fold position 114 and the line of sight 120 corresponding to parameters or attributes of the display region selection 208-3 (e.g., the fold position 114-1 and the line of sight 120-1). In another example, when the user 122 is viewing the mobile device 102 from a back side (e.g., opposite the camera side) of the flexible display 104, the content positioner logic 202 causes the content positioner 124 to select the far-sensor display region 128-2 (of the same display surface 206 as the near-sensor display region 128-1) in response to the fold position 114 and the line of sight 120 corresponding to parameters or attributes of the display region selection 208-4 (e.g., the fold position 114-1 and the line of sight 120-2).

Figure 4A:
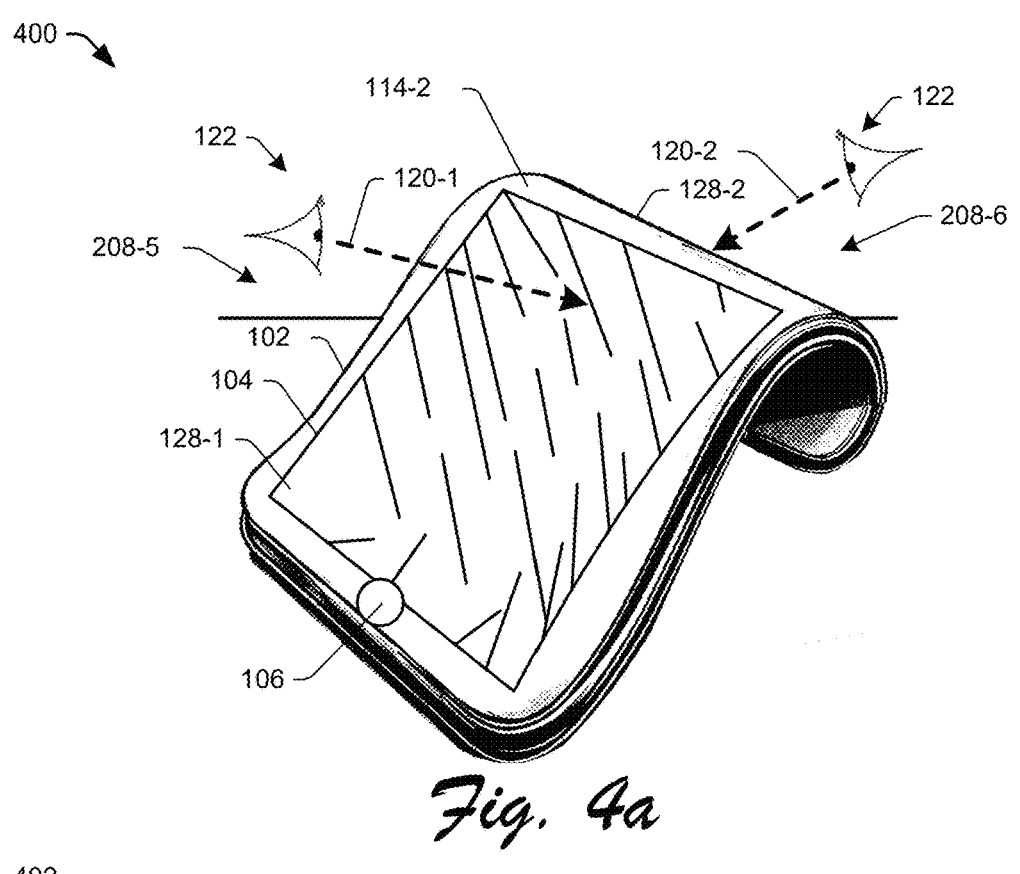
FIG. 4a and FIG. 4b each depict another example of a mobile device performing aspects of sight detection to dynamically select visible portions of flexible displays in accordance with one or more implementations.
Figure 4B:
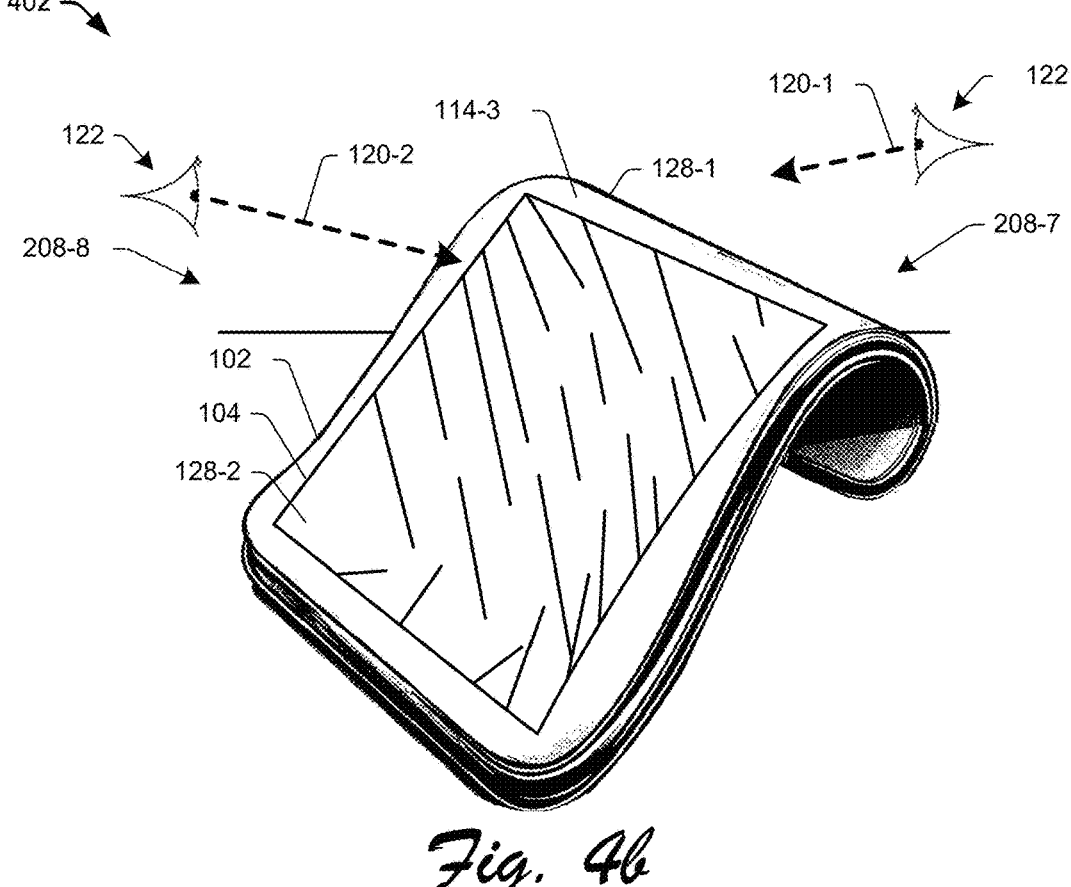

FIG. 4a and FIG. 4b each illustrate different scenarios where the mobile device 102 is not folded at the middle fold position 114-1, but instead partially rolled or folded around one of the fold positions 114-1 or 114-2. When set on a surface in this shape, the mobile device 102 operates in a ramp mode (e.g., to have at least a partial L-shape or a J-shape). In this configuration, the mobile device 102 is useful for group viewing or viewing the mobile device 102 from a distance.

Consider a display region selection 208-5 and a display region selection 208-6, which are each depicted in a scenario 400 illustrated in FIG. 4a. The user 122 places the mobile device 102 on a surface after rolling or bending the flexible display 104 near the fold position 114-2 into the L-shape or J-shape. The mobile device 102 contacts the surface near each of the two shorter ends of the flexible display 104, e.g., one end of the flexible display 104 near the camera 106 and an opposite end of the flexible display 104 furthest from the camera 106.

When the user 122 is viewing the mobile device 102 from a camera side of the flexible display 104, the content positioner logic 202 causes the content positioner 124 to select the near-sensor display region 128-1 in response to the fold position 114 and the line of sight 120 corresponding to parameters or attributes of the display region selection 208-5 (e.g., the fold position 114-2 and the line of sight 120-1). In another example, when the user 122 is viewing the mobile device 102 from the opposite side of the mobile device 102 as the camera 106, the content positioner logic 202 causes the content positioner 124 to select the far-sensor display region 128-2 of the same display surface 206 in response to the fold position 114 and the line of sight 120 corresponding to parameters or attributes of the display region selection 208-6 (e.g., the fold position 114-2 and the line of sight 120-2).

Lastly, consider a display region selection 208-7 and the display region selection 208-8, which are each depicted in a scenario 402 illustrated in FIG. 4b. The mobile device 102 is operating in ramp mode similar to the scenario 400, however, the mobile device 102 is rolled or bent near the fold position 114-3 to conform to the L-shape or J-shape.

When the user 122 is viewing the mobile device 102 from a camera facing side of the flexible display 104, the content positioner logic 202 causes the content positioner 124 to select the near-sensor display region 128-1 in response to the fold position 114 and the line of sight 120 corresponding to parameters or attributes of the display region selection 208-7 (e.g., the fold position 114-3 and the line of sight 120-1). In another example, when the user 122 is viewing the mobile device 102 from outside a field of view of the camera 106, the content positioner logic 202 causes the content positioner 124 to select the far-sensor display region 128-2 in response to the fold position 114 and the line of sight 120 corresponding to parameters or attributes of the display region selection 208-8 (e.g., the fold position 114-3 and the line of sight 120-2).

FIG. 5 illustrates a flow chart depicting an example method 500 for sight detection to dynamically select visible portions of flexible displays in accordance with one or more implementations. Operations of the method 500, for instance, may be performed in the context of the environment 100, such as by the mobile device 102.

At operation 502, an application is executed that generates graphical content to be presented on a flexible display. For example, the mobile device 102 executes the device application 110, which during execution, outputs the application content 116 including the graphical content 126.

Optionally, at operation 504, a fold position is identified where the flexible display is bent. The flexible display 104 outputs an indication of the fold position, for example. In other examples, the flexible display 104 has a single possible fold position and in other examples, the flexible display 104 has a plurality of different fold positions from which the fold position is identified.

At operation 506, a user line of sight to the flexible display is detected based on a sensor. For example, the sight detector 112 receives the test image 118 from the camera 106. Based on analyzing the test image 118, the sight detector 112 outputs the line of sight 120. The line of sight 120 corresponds to the first line of sight 120-1, for example, when the sight detector 112 identifies a human face or eyes of the user 122. The line of sight 120 output from the sight detector 112 may correspond to the second line of sight 120-2 when the sight detector 112 fails to identify a person or human face from the test image 118.

Next, at operation 508, the mobile device 102 determines whether the user line of sight is detectable with a sensor. The line of sight 120 may be considered camera or sensor detectable when the test image 118 provides a discernable human face, and the line of sight is not camera or sensor detectable when no human face or eyes are discernable from the test image 118. Depending on whether the line of sight 120 is detectable with the camera 106 or other sensor, the display region 128 of the flexible display 104 is selected based on the fold position 114, a camera position, and the user line of sight 120. For example, a "yes" branch from the operation 508 continues the method 500 by executing operation 510 to select the display region 128 using the first line of sight 120-1. A "no" branch resulting from the operation 508 proceeds to operation 512 to select the display region 128 using the second line of sight 120-2.

At operation 510, a near-sensor display region between the camera position and the fold position is selected when the user line of sight is detectable with the camera. For example, the near-camera display region 128-1 is selected by the content positioner 124 for displaying the graphical content 126 when the first line of sight 120-1 is detected.

At operation 512, a far-sensor display region between the fold position and a farthest end of the flexible display from the camera position is selected when a second user line of sight is undetectable with the camera. For example, the content positioner 124 selects the far-camera display region 128-2 for displaying the graphical content 126 when the second line of sight 120-1 is not detected.

Lastly, at operation 514, the graphical content is displayed in the selected display region. For example, the UI control 108 communicates the graphical content 126 and the display region 128 to the flexible display 104 to present the application content 116 output from the device application 110.

In some examples, the operations 506 through 514 are repeated depending on a type of application content being displayed. For example, the application content 116 comprises a streaming video and the operations 506 through 514 are repeated while the video is being streamed to dynamically update the display region 128 selected for presenting the graphical content 126. The graphical content 126 is displayed on different display regions of the same display surface 206 depending on how the flexible display 104 is oriented relative the user line of sight, which may change over time. In another example, the application content 116 comprises a notification or alert indicated by the graphical content 126 and the operations 506 through 514 occur once to show the notification or alert contemporaneously with when the application content 126 including the notification is received from the device application 110.

The example methods described above may be performed in various ways, such as for implementing different aspects of the systems and scenarios described herein. Any services, components, modules, methods, and/or operations described herein can be implemented using software, firmware, hardware (e.g., fixed logic circuitry), manual processing, or any combination thereof. Some operations of the example methods may be described in the context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 6:
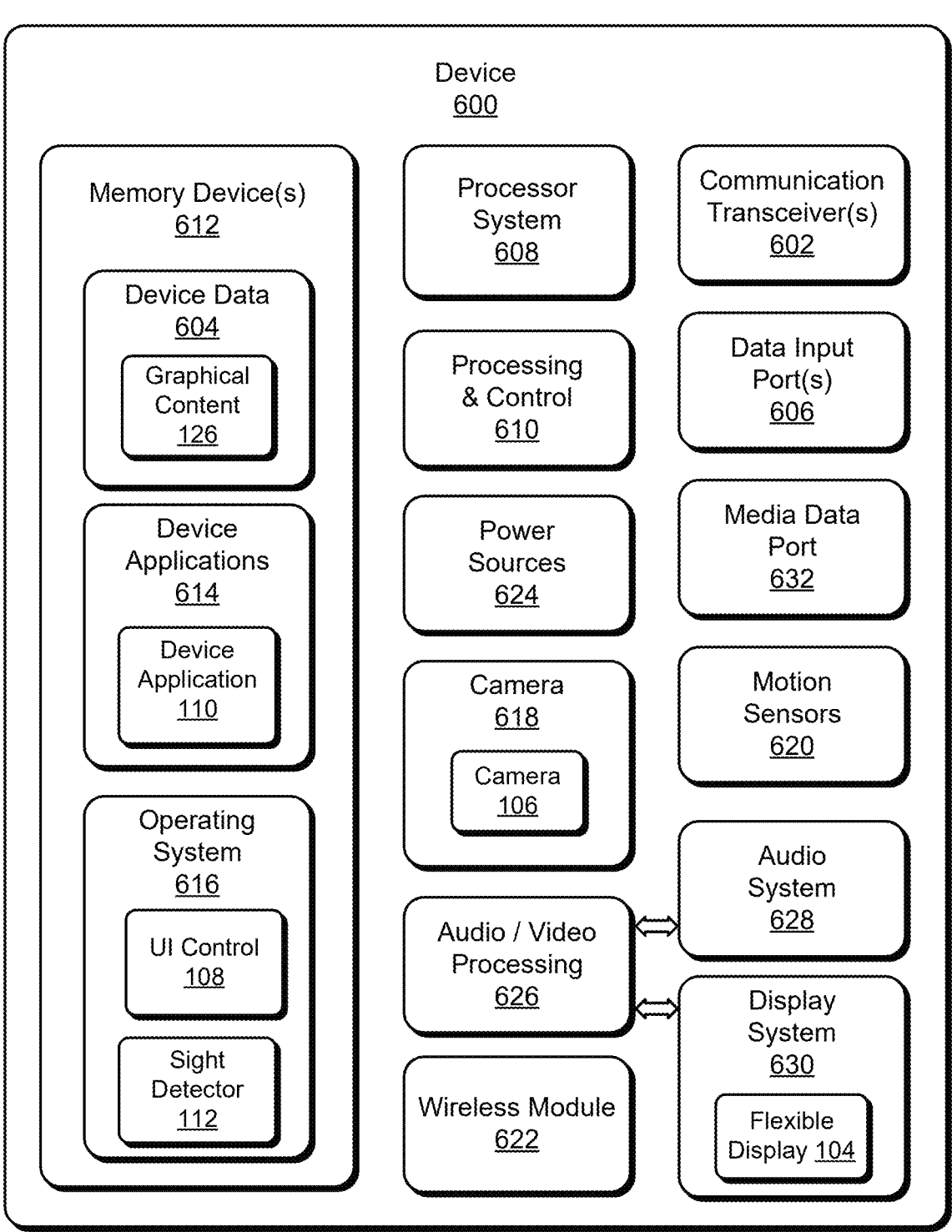
FIG. 6 illustrates various components of an example device in which aspects of sight detection to dynamically select visible portions of flexible displays can be implemented in accordance with one or more implementations.

FIG. 6 illustrates various components of an example device 600 in which aspects of sight detection to dynamically select visible portions of flexible displays can be implemented in accordance with one or more implementations. The device 600 can be implemented as any of the devices described with reference to the previous FIGS. 1-5, such as any type of mobile device, mobile phone, wearable device, tablet, computing device, communication device, entertainment device, gaming device, media playback device, and/or other type of electronic device that uses bendable, foldable, or otherwise flexible display technology, such as the flexible display 104. For example, aspects of the mobile device 102, as shown and described with reference to FIGS. 1-5 may be implemented as the example device 600.

The device 600 includes communication transceivers 602 that enable wired and/or wireless communication of device data 604 with other devices. The device data 604 can include any of device identifying data, device location data, wireless connectivity data, and wireless protocol data. Additionally, the device data 604 can include any type of audio, video, and/or image data. The graphical content 126 is an example of the device data 604.

The device data 604 can include any type of communication data, such as radio measurements and radio messages. Example communication transceivers 602 include wireless personal area network (WPAN) radios compliant with various IEEE 802.15 (Bluetooth™) standards, wireless local area network (WLAN) radios compliant with any of the various IEEE 802.10 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory 612 can include various implementations of random access memory (RAM), read-only memory (ROM), flash memory, and other types of storage media in various memory device configurations. The device 600 may also include a mass storage media device. Computer-readable storage memory 612 represents media and/or devices that enable persistent and/or non-transitory storage of information in contrast to mere signal transmission, carrier waves, or signals per se. Computer-readable storage memory 612 do not include signals per se or transitory signals.

The computer-readable storage memory 612 provides data storage mechanisms to store the device data 604, other types of information and/or data, and various device applications 614 (e.g., software applications). The device applications 614 includes the device application 110, for instance. The device applications 614 may also include a device manager, such as any form of a control application, software application, signal-processing and control module, code that is native to a particular device, a hardware abstraction layer for a particular device, and so on. As another example of device programs maintained in the computer-readable storage memory 612 include instructions for an operating system 616. For example, the UI control 108 (including the content positioner 124) and/or the sight detector 112 are implemented as part of the operating system 616. The instructions associated with the device applications 614 and the operating system 616 can be maintained as software instructions within the memory 612 and executed by the processing system 608.

In this example, the example device 600 also includes a camera 618 and motion sensors 620, such as may be implemented in an inertial measurement unit (IMU). The motion sensors 620 can be implemented with various sensors, such as a gyroscope, an accelerometer, and/or other types of motion sensors to sense motion of the device. The various motion sensors 620 may also be implemented as components of an inertial measurement unit in the device. The camera 618 is an example of the camera 106, and is usable to capture images, including to enable the sight detector 112 to determine the user line of sight 120. The motion sensors 620 are used as input devices, for example, to detect when the user 122 is holding the device 600.

The device 600 also includes a wireless module 622, which is representative of functionality to perform various wireless communication tasks. The device 600 can also include one or more power sources 624, such as when the device is implemented as a mobile device. The power sources 624 may include a charging and/or power system, and can be implemented as a flexible strip battery, a rechargeable battery, a charged super-capacitor, and/or any other type of active or passive power source.

The device 600 also includes an audio and/or video processing system 626 that generates audio data for an audio system 628 and/or generates display data (e.g., the graphical content 126) for a display system 630. The flexible display 104 is an example of the display system 630. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 632. In implementations, the audio system and/or the display system are integrated components of the example device. Alternatively, the audio system and/or the display system are external, peripheral components to the example device.

Although implementations of embedding nearby user presence within captured images have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a system, including: at least one memory, and at least one processor coupled with the at least one memory and configured to cause the system to: detect a user line of sight to a flexible display based on a sensor, select a visible display region of the flexible display based on a fold position where the flexible display is bent, a sensor position, and the user line of sight, and display graphical content in the visible display region.

In some aspects, the techniques described herein relate to a system, wherein the processor is configured to cause the system to select the visible display region to be a near-sensor display region between the sensor position and the fold position when the user line of sight is detectable with the sensor.

In some aspects, the techniques described herein relate to a system, wherein the processor is configured to cause the system to select the visible display region to be a far-sensor display region between the fold position and a farthest end of the flexible display from the sensor position when the user line of sight is undetectable with the sensor.

In some aspects, the techniques described herein relate to a system, wherein the processor is configured to cause the system to display the graphical content in the visible display region in response to at least one of determining that the graphical content is resizable to fit within the visible display region or resizing the graphical content to fit within the visible display region.

In some aspects, the techniques described herein relate to a system, wherein the processor is configured to identify the fold position where the flexible display is bent.

In some aspects, the techniques described herein relate to a system, wherein the flexible display is bendable at a single fold position or a plurality of different fold positions, and the fold position is identifiable as the single fold position or one of the plurality of different fold positions.

In some aspects, the techniques described herein relate to a system, wherein the sensor includes a camera and the user line of sight is detected from an image captured with the camera, and the user line of sight is camera detectable when the image depicts at least a portion of a human face, and the user line of sight is not camera detectable when the image does not depict the human face.

In some aspects, the techniques described herein relate to a system, wherein the at least one processor is configured to further cause the system to orient the graphical content displayed in the visible display region to correspond to an orientation of the human face depicted in the image.

In some aspects, the techniques described herein relate to a mobile device including: at least one memory, and at least one processor coupled with the at least one memory and configured to cause the mobile device to: detect a user line of sight relative a flexible display of the mobile device based on a camera of the mobile device, select a visible display region of the flexible display based on a fold position where the flexible display is bent, a camera position, and the user line of sight, and display graphical content in the visible display region.

In some aspects, the techniques described herein relate to a mobile device, wherein the camera includes a camera lens with a field of view that projects outward from a display surface of the flexible display that presents the graphical content.

In some aspects, the techniques described herein relate to a mobile device, wherein the flexible display is rectangular, and the camera position is closer to one of two shorter ends of the flexible display.

In some aspects, the techniques described herein relate to a mobile device, wherein the mobile device is placed on a surface that contacts each of the two shorter ends of the flexible display.

In some aspects, the techniques described herein relate to a mobile device, wherein the fold position includes a middle fold position of the flexible display that is between the two shorter ends.

In some aspects, the techniques described herein relate to a mobile device, wherein the fold position includes a far camera fold position of the flexible display that is closer to a farthest short end of the flexible display from the camera position.

In some aspects, the techniques described herein relate to a mobile device, wherein the fold position includes a near camera fold position of the flexible display that is closer to the camera position than a farthest short end of the flexible display from the camera position.

In some aspects, the techniques described herein relate to a mobile device, wherein the mobile device is placed on a surface that contacts a second display region of the flexible display that is outside the visible display region.

In some aspects, the techniques described herein relate to a mobile device, wherein the fold position corresponds to an area of the flexible display that is at least partially bent about a user arm or user wrist.

In some aspects, the techniques described herein relate to a method performed by a mobile device, the method including: detecting, based on a camera of the mobile device, a user line of sight to a flexible display of the mobile device, selecting, a visible display region of the flexible display based on a fold position where the flexible display is bent, a camera position, and the user line of sight, and displaying graphical content in the visible display region.

In some aspects, the techniques described herein relate to a method, wherein the mobile device is bent at the fold position to at least partially have at least one of an L-shape, a J-shape, a V-shape, or a U-shape.

In some aspects, the techniques described herein relate to a method, further including: selecting the visible display region to be a near-camera display region between the camera position and the fold position when a first user line of sight is detectable with the camera, and selecting the visible display region to be a far-camera display region between the fold position and a farthest end of the flexible display from the camera position when a second user line of sight is undetectable with the camera.

The invention claimed is:

1. A system, comprising:
at least one memory; and
at least one processor coupled with the at least one memory and configured to cause the system to:
determine whether a user line of sight to a flexible display is detectable or undetectable with a sensor;
select one of a near-sensor display region or a far-sensor display region as a visible display region of the flexible display based on a fold position where the flexible display is bent, a sensor position, and whether the user line of sight is detectable or undetectable with the sensor; and
display graphical content in the visible display region.

2. The system of claim 1, wherein the at least one processor is configured to cause the system to:
select the visible display region to be the near-sensor display region when the user line of sight is detectable with the sensor from the sensor position; and
select the visible display region to be the far-sensor display region when the user line of sight is undetectable with the sensor from the sensor position.

3. The system of claim 2, wherein the near-sensor display region is between the sensor position and the fold position, and the far-sensor display region is between the fold position and a farthest end of the flexible display from the sensor position.

4. The system of claim 1, wherein the at least one processor is configured to cause the system to display the graphical content in the visible display region in response to at least one of determining that the graphical content is resizable to fit within the visible display region or resizing the graphical content to fit within the visible display region.

5. The system of claim 1, wherein the at least one processor is configured to identify the fold position where the flexible display is bent.

6. The system of claim 5, wherein the flexible display is bendable at a single fold position or a plurality of different fold positions, and the fold position is identifiable as the single fold position or one of the plurality of different fold positions.

7. The system of claim 6, wherein the sensor comprises a camera, the user line of sight is detectable with the sensor when an image captured with the camera depicts at least a portion of a human face, and the user line of sight is undetectable with the sensor when the image does not depict the human face.

8. The system of claim 7, wherein the at least one processor is configured to further cause the system to orient the graphical content displayed in the visible display region to correspond to an orientation of the human face depicted in the image.

9. A method performed by a mobile device, the method comprising:

determining, based on a camera of the mobile device, whether a user line of sight to a flexible display of the mobile device is detectable or undetectable with the camera;

selecting one of a near-camera display region or a far-camera display region as a visible display region of the flexible display based on a fold position where the flexible display is bent, a camera position, and whether the user line of sight is detectable or undetectable with the camera; and displaying graphical content in the visible display region.

10. A mobile device comprising:

at least one memory; and at least one processor coupled with the at least one memory and configured to cause the mobile device to:

determine whether a user line of sight relative to a rectangular flexible display of the mobile device is detectable or undetectable with a camera of the mobile device;

select a visible display region of the rectangular flexible display on either side of a fold position where the rectangular flexible display is bent between two shorter ends of the rectangular flexible display that contact a surface based on a camera position and whether the user line of sight is detectable or undetectable with the camera; and display graphical content in the visible display region.

11. The mobile device of claim 10, wherein the camera comprises a camera lens with a field of view that projects outward from a display surface of the rectangular flexible display that presents the graphical content.

12. The mobile device of claim 10, wherein the camera position is closer to one of the two shorter ends of the rectangular flexible display.

13. The mobile device of claim 10, wherein the fold position comprises a middle fold position of the rectangular flexible display that is between the two shorter ends.

14. The mobile device of claim 10, wherein the fold position comprises a far camera fold position of the rectangular flexible display that is closer to a farthest short end of the rectangular flexible display from the camera position.

15. The mobile device of claim 10, wherein the fold position comprises a near camera fold position of the rectangular flexible display that is closer to the camera position than a farthest short end of the rectangular flexible display from the camera position.

16. The mobile device of claim 10, wherein the mobile device is bent at the fold position to at least partially have at least one of an L-shape, a J-shape, a V-shape, or a U-shape as the rectangular flexible display is bent between the two shorter ends that contact the surface.

17. The method of claim 9, wherein the mobile device is placed on a surface that contacts a second display region of the flexible display that is outside the visible display region.

18. The method of claim 9, wherein the fold position corresponds to an area of the flexible display that is at least partially bent about a user arm or user wrist.

19. The method of claim 9, wherein the near-camera display region is between the camera position and the fold position, the method further comprising:

selecting the visible display region to be the near-camera display region when the user line of sight is detectable with the camera.

20. The method of claim 9, wherein the far-camera display region is between the fold position and a farthest end of the flexible display from the camera position, the method further comprising:

selecting the visible display region to be the far-camera display region when the user line of sight is undetectable with the camera.

* * * * *